US007401326B1

(12) United States Patent
Durham et al.

(10) Patent No.: US 7,401,326 B1
(45) Date of Patent: Jul. 15, 2008

(54) COMPILING PROTOCOL ANALYSIS CODE USING PROTOCOL DATABASE

(75) Inventors: Douglas Durham, Sunnyvale, CA (US); Dominic Coupal, Bromont (CA)

(73) Assignee: Finisar Corporation, Sunnyvale, CA (US)

( * ) Notice: Subject to any disclaimer, the term of this patent is extended or adjusted under 35 U.S.C. 154(b) by 318 days.

(21) Appl. No.: 10/179,671

(22) Filed: Jun. 24, 2002

Related U.S. Application Data

(63) Continuation-in-part of application No. 10/001,454, filed on Oct. 24, 2001, now Pat. No. 6,931,574.

(51) Int. Cl.
*G06F 9/45* (2006.01)
(52) U.S. Cl. .................. 717/139; 717/106; 717/140
(58) Field of Classification Search ......... 717/106–109, 717/136–147; 707/100–102; 709/230, 236; 712/209, 210
See application file for complete search history.

(56) References Cited

U.S. PATENT DOCUMENTS

| 5,347,524 | A | 9/1994 | I'Anson et al. ............. 371/29.1 |
| 5,850,388 | A | 12/1998 | Anderson et al. ........... 370/252 |
| 6,000,041 | A | 12/1999 | Baker et al. .................... 714/39 |
| 6,122,757 | A | 9/2000 | Kelley .......................... 714/39 |
| 6,219,050 | B1 | 4/2001 | Schaffer ...................... 345/340 |
| 6,347,382 | B1 | 2/2002 | Nakayama et al. ............. 714/37 |
| 6,532,473 | B2 * | 3/2003 | Niazi et al. .............. 707/103 X |
| 6,665,725 | B1 * | 12/2003 | Dietz et al. .................. 709/230 |

OTHER PUBLICATIONS

Castellucia et al., "Generating Efficient Protocol Code From an Abstract Specification", IEEE, pp. 514-524, 1997.*
Dwarkadas, "An Integrated Compiled-Time/Run-Time Software Distributed Shared Memory System", CiteSeer, Proc. of the 7th Symp. on Architectural Support for Programming Languages and Operating Systems, pp. 1-12, 1996.*

* cited by examiner

*Primary Examiner*—Ted T. Vo
(74) *Attorney, Agent, or Firm*—Workman Nydegger

(57) ABSTRACT

Generating program code to be used by a protocol analyzer based on definitional information relating to a data protocol. A protocol database that includes definitional information relating to characteristics of a protocol is stored. The definitional information, which is expressed in a computer-interpretable format, is processed to generate program code expressed in a programming language. The program code incorporates the definitional information and includes logic that is to be executed to interpret and analyze data packets having the protocol. In this manner, the program code to be used by the protocol analyzer is generated mechanically, without requiring software developers. When the program code needs to be updated in view of changes to existing protocols or the introduction of new protocols, the protocol database is updated. These updates are then propagated to the program code without requiring direct manipulation of the code by software developers.

2 Claims, 4 Drawing Sheets

COMPILING PROTOCOL ANALYSIS CODE USING PROTOCOL DATABASE

RELATED APPLICATION

This application is a continuation-in-part of U.S. patent application Ser. No. 10/001,454, filed Oct. 24, 2001, now U.S. Pat. No. 6,931,574 entitled "Systems and Methods for Interpreting Communications Packets," which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. The Field of the Invention

The present invention relates generally to communications networks. More particularly, the present invention relates to systems and methods for interpreting the content of data frames that are present on a communications network.

2. The Relevant Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Ethernet, Token Ring, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network.

However, many of the network types have similar characteristics. For the most part, digital data are usually transmitted over a network medium via frames (also referred to as "data frames" or "data packets") that can be of a fixed or a variable length. Typically, data frames have headers and footers on the two ends of the frame, and a data portion disposed in the middle. The specific layout of these data frames is typically specified by the "physical layer protocol" of the network being used. For example, the Ethernet physical layer protocol specifies that the structure of a data frame include a preamble field, a six-byte destination address field, a six-byte source address field, a two-byte type field, a data field having a variable size (46-1,500 bytes), and a four-byte error checking field. Other physical layer protocols will specify similar types of frame layouts.

As is well known, transmissions from one network connected device to another device are typically passed through a hierarchy of protocol layers. Each layer in one network connected device essentially carries on a conversation with a corresponding layer in another network connected device with which the communication is taking place and in accordance with a protocol defining the rules of communication.

For example, one well-known protocol standard is the Open Systems Interconnection (OSI) Model. OSI defines a seven-layer protocol model, which is widely used to describe and define how various vendors' products communicate. In that model, the highest network layer is the Application Layer. It is the level through which user applications access network services. The next layer is the Presentation Layer which translates data from the Application Layer into an intermediate format and provides data encryption and compression services. The next layer is referred to as the Session Layer, which allows two applications on different network connected devices to communicate by establishing a dialog control between the two devices that regulates which side transmits, when each side transmits, and for how long. The next layer, the Transport Layer, is responsible for error recognition and recovery, repackaging of long messages into small packages of information, and providing an acknowledgement of receipt. The next layer is the Network Layer, which addresses messages, determines the route along the network from the source to the destination computer, and manages traffic problems, such as switching, routing and controlling the congestion of data transmissions.

It is the next layer, referred to as the Data Link Layer, which packages raw bits into the logical structured data packets or data frames, referred to above. This would correspond, for example, to the Ethernet physical layer protocol noted above. This layer then sends the data frame from one network connected device to another. The lowest layer in the hierarchal model is the Physical Layer, which is responsible for transmitting bits from one network connected device to another by regulating the transmission of a stream of bits over a physical medium. This layer defines how the cable is attached to the network interface card within the network connected device and what transmission techniques are used to send data over the cable.

Thus, as a message is passed down through each of these respective layers, each layer may add protocol information to the message. Thus, the "data" present within the data payload of the data frame at the Data Link Layer (e.g., the Ethernet data frame) typically comprises a protocol stack comprised of multiple message packets. Each message packet has its own protocol format, and it may in turn be embedded within the data payload of another higher layer message, also having a different protocol.

As communication networks have increased in number and complexity, the networks have become more likely to develop a variety of problems, that are in turn more and more difficult to diagnose and solve. For example, network performance can suffer due to a variety of causes, such as the transmission of unnecessarily small frames of information, inefficient or incorrect routing of information, improper network configuration and superfluous network traffic, to name just a few. Such problems are compounded by the fact that many networks are continually changing and evolving due to growth, reconfiguration and introduction of new network typologies and protocols as well as new interconnection devices and software applications.

Consequently, diagnostic equipment, commonly referred to as "network protocol analyzers," have been developed for capturing, analyzing, and displaying information about data frames that are transmitted over a network. Typically, protocol analyzers are designed to identify, analyze and resolve interoperability and performance problems in different networks typologies and protocols. For example, the equipment enables users to perform a wide variety of network analysis tasks, such as counting errors, filtering frames, generating traffic and triggering alarms.

To do so, a protocol analyzer typically has the capability to capture all of the physical layer data frames (packets) generated by other stations (nodes) on the network. The analyzer is then designed to evaluate the contents of each data frame and, preferably, display the contents along with a meaningful description, and preferably in the sequence in which they were captured from the network. Thus, a protocol analyzer typically includes a capture engine and a protocol decoder. The analysis data that can be displayed with each captured data frame can include a variety of information, including the time at which the packet was captured, the length of the packet, packet address information for one or more protocol layers, and a set of protocol decodes at each layer that the protocol analyzer is capable of decoding.

While protocol analyzers have proven to be extremely useful tools for debugging, testing and otherwise evaluating various operating characteristics of networks and network equipment, the implementation of such analyzers is difficult and previous approaches have not been entirely satisfactory. In particular, in order for the protocol analyzer to provide useful information for a given network, ideally it must be capable of interpreting each of the various—and sometimes numerous—protocols that are typically embedded within the physical layer data frame. The ability to perform this task is complicated greatly by the fact that today's communications networks utilize literally hundreds of different message protocols that may be present in any given data frame. As noted, a typical physical layer data frame on a network cable medium will have a data payload that is composed of multiple protocol layers. In fact, this "stacking" of message protocols within a physical layer data frame can often be more than five layers deep. Thus, today's protocol analyzer must be capable of interpreting and analyzing a myriad of different protocol types and combinations.

However, most protocol analyzers are specifically programmed to interpret and present a finite number of protocol types, and thus are limited in their ability to fully analyze all networks. The problem is exacerbated by the fact that new protocols are continuously being developed and existing protocols modified and updated. Thus, it has been extremely difficult for protocol analyzers to support all existing protocols, and it is difficult to update existing protocol analyzers to support new and modified protocols.

Typically, protocol analyzers are configured to support particular protocols by way of customized software. Specifically, the protocol analyzer is a programmable device (or is operatively connected to a programmable master device, such as a personal computer) that is programmed with dedicated program code addressed specifically to the interpretation and analysis of a protocol type. If a new protocol capability is needed, or if the existing protocol is changed, then the source code for the program must be modified, updated or rewritten and then recompiled in order for the analyzer to support the new protocol. When a change regarding the protocol capabilities of the protocol analyzer is to be made, the software developer obtains a protocol specification, written in a declarative format, studies the declarative protocol specification, and manually translates the declarative protocol specification to procedural executable code, written in a procedural language (e.g., C++).

Obviously, this approach of manually converting a declarative protocol specification into procedural executable code is terribly inefficient, and is costly and difficult to implement, since it requires software developers with significant knowledge of the details of a particular protocol. In addition, the program code is written in a single selected programming language, such as C++. Once the program code is developed using a particular programming language, it is difficult and expensive to write analogous code in other programming languages.

Thus, there is a need in the art to provide an efficient and flexible method for defining a protocol, and then generating the program code for analyzing it. The generation of programming code allows for the most efficient embodiment of a decoder. Such a method would require a minimal amount of manual work by software developers. In particular, the methodology should be able to be performed by anyone with familiarity with communications protocols, and not require advanced programming skills. Also it would be desirable if different program code could be generated with equivalent functionality, to suit the needs of different computing devices or computer operating systems. These and other needs are addressed by embodiments of the present invention.

BRIEF SUMMARY OF EMBODIMENTS OF THE INVENTION

These and other problems in the prior art are addressed by embodiments of the present invention, which relate to the generation of program code for interpreting and analyzing a protocol type based on a protocol database that includes definitions or information that describes the relevant characteristics of a particular protocol. Rather than requiring software developers with detailed knowledge of a particular protocol to write, test, and debug program code that is used to interpret and analyze the protocol, the present invention enables the code to be compiled mechanically (i.e., by machine and without manual programming or software development) using the protocol database.

This approach is significantly less expensive, because the knowledge of the protocol is applied to the database rather than being incorporated manually into the complex code that is generated therefrom. Moreover, the program code can be generated in any of a variety of programming languages. Thus, the same protocol database can be used to generate code in, for example, C++ or Java, as necessary, without direct programming of the code by a software developer. In addition, the process of adapting the code to variations in the protocol is simpler, in that the definitions of the protocol characteristics can be made in the protocol database rather than being manually incorporated into the code that is to be used for interpreting and analyzing the protocol.

The protocol database includes information that describes the content of a data frame captured on a communications network. The description is provided in a high level, easy to understand format. Importantly, the methodology utilized by preferred embodiments of the invention utilizes a "protocol definition" that can be applied to data frames of any physical layer protocols, such as Ethernet, Fibre Channel, InfiniBand or others. Moreover, the protocol definition allows for all of the protocol stacks that may be contained within the physical data frame to also be identified and also described in an understandable format. Also, in direct contrast to existing methods for describing the content of data frames, the present approach does not require the need for customized and dedicated computer software programs to describe a particular frame protocol. Similarly, embodiments of the present invention are not "hardware specific"—that is, the protocol definition is provided in a manner that can be used in any network equipment device, such as protocol analyzers.

In general, embodiments of the present invention utilize a unique set of "definition constructs" that are used to describe the relevant characteristics of a given physical layer protocol. In addition, the definition constructs also provide the ability to describe the various higher level protocols that may be included within the data frame. The unique character of the constructs also provide the ability to identify multiple stacks of protocol layers within the data frame.

Thus, the present invention provides significant advantages over the inefficient techniques of the prior art that require manual translation of a declarative protocol specification to procedural specification of the protocol written in executable code. In contrast, the present invention generates program code for interpreting and analyzing a protocol type by first translating one declarative specification of a protocol (i.e., a conventional protocol specification) to another declarative specification (i.e., the protocol databases described herein). The declarative protocol database is then mechanically translated to the procedural language of the program code that can be used to interpret and analyze the protocol. This model of generating the code does not require manual translation of the specification from a declarative format to a procedural language, which results in a significant reduction in the associated costs and in the likelihood of error.

The foregoing, together with other features and advantages of the present invention, will become more apparent when referred to the following specification, claims and accompanying drawings.

BRIEF DESCRIPTION OF THE DRAWINGS

The appended drawings contain figures of a preferred embodiment of the present invention. The above-mentioned features of the invention, as well as other features, will be described in connection with the preferred embodiment. However, the illustrated embodiment is only intended to illustrate the invention and not limit the invention. The drawings contain the following figures.

DETAILED DESCRIPTION OF PREFERRED EMBODIMENTS

I. Introduction

Figure 1:
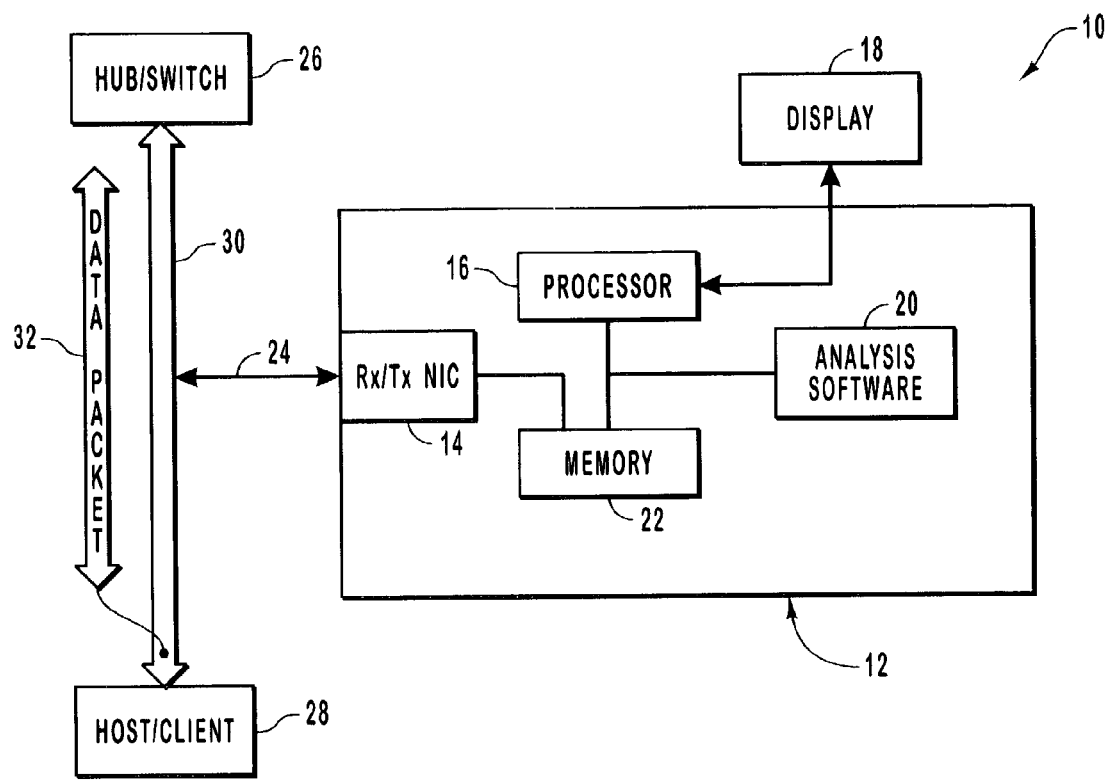
FIG. 1 illustrates one presently preferred embodiment of an overall protocol analyzer system for analyzing data frames using program code that has been generated in accordance with protocol definition constructs.

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

To assist in the organization of the detailed description and to aid the reader, the following detailed description is divided into sections that have descriptive titles to indicate the general nature of the information that follows. The section titles are not intended to indicate that information suggested by any one section title is not contained in any other section, nor should the titles be construed as limiting of the general nature of the invention.

Also, portions of the following description of presently preferred embodiments is illustrated by way of reference to an Ethernet network topology and the Ethernet physical layer protocol. However, limiting examples to this environment is intended only to provide consistency in order to facilitate understanding of the present invention, and it is not meant to indicate a limitation of the suitability of the present invention to other network environments and network protocols. Indeed, as will be readily apparent to one of skill in the art, the teachings of the present invention are equally applicable to the analysis of practically any network data frame and protocol, either currently existing or that are yet to be developed. Examples include, but are not limited to network protocols such as: Fibre Channel, Fiber Distributed Data Interface (FDDI), InfiniBand, etc.

The description will begin will a discussion of methods for constructing protocol databases. The description then proceeds to a discussion of methods according to the invention for generating program code for interpreting and analyzing data packets having a protocol, based on the protocol database. A detailed description of techniques for generating protocol databases is included in U.S. patent application Ser. No. 10/001,454 (the "'454 application"), filed Oct. 24, 2001, and entitled "Systems and Methods for Interpreting Communications Packets," which is incorporated herein by reference. While the protocol databases that are used to generate the program code for interpreting and analyzing data packets having particular protocols can be generated according to the techniques disclosed herein, and in the '454 application, the protocol databases can also be generated in other techniques.

The '454 application discloses methods for generating the protocol databases and using protocol definition files of the protocol databases to interpret data packets. While interpreting and analyzing network data packets as described in the '454 application provides significant benefits, the present invention uses the protocol databases in ways that can be even more efficient from a computational and memory standpoint, by generating executable program code that incorporates the information of the protocol definition files. However, unlike conventional program code used with protocol decoders, such as those used in protocol analyzers, the program code according to the invention is not developed manually by knowledgeable software developers, but is generated mechanically from the protocol databases. Thus, the present invention combines the computational benefits of using executable program code in protocol analyzers with the benefits arising from using protocol databases to describe the characteristics of protocols.

II. Overview of the Preferred Embodiments

Embodiments of the present invention include functions that may be implemented in computer hardware, computer software or a combination of both hardware and software. However, in one presently preferred embodiment, the functionality is implemented with a combination of computer hardware and software.

A. Software Embodiments Overview

Certain aspects of presently preferred embodiments are implemented by way of computer executable instructions (computer software) executing within an appropriate computing environment. Software implemented aspects of the present invention preferably provide several functions. First, a data frame analysis methodology is disclosed, which includes the ability to ascertain the characteristics of the contents of a data frame captured on the network, and then perform analysis or other transformation of the data, examples of which include displaying relevant information about the data frame or transforming the contents of the data frame to a different binary format. The data frame can be formatted in accordance with any given physical layer protocol, such as Ethernet, Fiber Channel, InfiniBand, etc., and may also be composed of multiple other protocol layers (i.e., Internet Protocol—IP, Address Resolution Protocol—ARP, Transmission Control Protocol—TCP, and many others). The program code that is used to analyze the frame contents is generated according to the invention based on a collection of "definition constructs." One example of suitable definition constructs is described in the '454 application. These constructs generically "define" the characteristics of a data frame for a given physical layer protocol. Moreover, the constructs can describe the characteristics of the various protocol layers that may be carried by the data frame, as well as the permutations and relationships between those various protocol layers.

In addition to providing a blueprint of the possible contents of a frame, the definition constructs also provide understandable descriptions of the various aspects of the frame itself, and of the higher level protocols that can be carried within the frame. These descriptions can then be used to provide an understandable description of the data frame and its contents when it is displayed to a user.

In a presently preferred embodiment, this collection of constructs is stored as a "protocol definition file," which can then be used to generate program code that is used by a protocol analyzer. Although the invention is described herein primarily in the context of generating program code based on program definition files of a protocol database, the program code can, in general, be generated using any other protocol definition that is expressed in a computer-interpretable format. When a network data frame is captured by the protocol analyzer, it is evaluated by the program code that has been generated based upon this protocol definition file and, using the definition constructs, is described in an understandable format—including each of the higher level protocols that are contained within the data frame. As will be shown, a protocol definition file can be created for the data frames of any given physical layer protocol, along with all of the various higher level protocol messages that may be contained within the physical layer data frame. The definition file can then be stored, for example, within a protocol database and then used to generate the program code, which is then used by a protocol analyzer, or similar device, to analyze the data frames of a network complying with the loaded definition file. Definition files can be created for new protocols, and/or can be easily updated when a protocol is modified—all using the same definition constructs. Moreover, the definition files are not "machine" or "application" specific; that is, the protocol definition file can be used by any device/application needing to evaluate the content of a network data frame, or that needs to perform any operations dependent on the frame content. For example, applications such as searching for the occurrence of a particular frame type, or filtering of frames having specific characteristics could utilize the protocol definition file to generate appropriate program code.

While the protocol definition file can be built merely by assembling the necessary definition constructs manually, in preferred embodiments, another software function provides a protocol editor function to create the appropriate constructs. Preferably, this protocol editor is implemented with a graphical user interface (GUI). This GUI allows the user to build the protocol definition file via an easy-to-understand graphics interface, thereby allowing a user to define the protocol in a manner that does not require a detailed knowledge of the format of the definition constructs. Instead, the user simply defines the protocol by interacting with the software implementing the front-end graphical interface by selecting appropriate fields, options and entering appropriate information. The protocol editor then builds the definition file using the appropriate syntax and definition constructs.

Yet another software-based aspect of a presently preferred embodiment provides the ability to display the results of a network protocol analysis, also preferably via a graphical user interface. The user interface is extremely flexible in that it allows the user to easily select what characteristics of the captured data frame should be displayed.

B. Hardware Embodiments Overview

In general, it will be appreciated that the preferred software environment addressed above is not limited to any particular hardware environment, nor must the software be used in connection with any one particular application. Indeed, as was noted, the protocol definition file can be used for any one of a number of applications where the content of a physical layer data frame is analyzed or otherwise acted upon, including frame protocol analysis, filtering, searching, etc.

By way of example and not limitation, in one presently preferred embodiment the program code generated based on the protocol definition is described as being used in connection with a protocol decoder. It will be appreciated that the protocol decoder that uses the program code can implemented in a dedicated protocol analyzer instrument having a capture engine or in any other suitable processing device.

Thus, the first primary function of the hardware in one embodiment of the invention is to provide the physical computing platform for execution of the software portion of the invention. Secondly, the hardware platform provides the ability to electrically and physically interface with the network that is being monitored. In addition, the hardware preferably provides the ability to physically display the graphical user interface, such as a video display device (e.g., a standard cathode-ray tube monitor or liquid crystal display) and that provides the user with the ability to interact with the GUI, such as by way of common input devices such as a keyboard and a mouse. Various aspects of presently preferred hardware implementations will be described in further detail below.

C. System Overview

Referring now to FIG. 1, an overall system view of one embodiment is generally designated at 10. In this particular embodiment, the system environment is centered on a network protocol analyzer device, which is designated generally at 12. As is well known, a protocol analyzer has a primary function of capturing, analyzing and displaying information about packets that are transmitted over a network. In the illustrated embodiment, the protocol analyzer 12 is shown as being operatively connected to a simplified communications network, designated generally at 30. For purposes of illustration, FIG. 1 depicts several network devices connected to the network, including a hub/switch 26 and a host/client 28. It will be appreciated that in a typical network environment, additional types of network devices would also be interconnected by way of the network 30. Although the invention is described herein primarily in the context of a protocol analyzer, the invention can also be practiced in combination with any other device that has a protocol decoder.

FIG. 1 also depicts the presence of physical layer data packets, such as is depicted at 32, being transmitted over the network between the network-connected devices. The format of this data packet (also sometimes referred to as a "data frame" or a "network packet") depends on the physical layer protocol being used, and it will be appreciated that the teachings of the present invention are applicable to any one of a number of protocol types. However, for purposes of illustration, the present invention will be described with respect to the physical layer protocol defined by the Ethernet standard (IEEE 802.3).

The protocol analyzer device 12 illustrated in FIG. 1 also includes a network interface card (NIC) 14 that allows for the physical and electrical interconnection with the network 30, as is depicted schematically at 24. Again, the type of network interface card used will depend on the physical layer protocol of the corresponding network 30. For an Ethernet network, the NIC 14 is an Ethernet network interface card. Also, the network interface card 14 is configured so as to be operated in a promiscuous mode, such that it is able to capture all packets traversing the network 30. As is well known, the interface card 14 actually captures serial data bits from the network medium, and then assembles the data into the separate data frames in accordance with the relevant physical layer protocol.

Included within the protocol analyzer device 12 is an appropriate CPU or processor 16 and conventional internal memory 22, which are interconnected by a system bus in a manner well known in the art. Also, there is a suitable computer storage location, such as a magnetic storage medium, that contains the packet analysis software module, designed at 20. The packet analysis software module includes executable program code that has been generated, or compiled, based on the contents of protocol database or other protocol definition as described herein. During execution, this software is typically loaded into memory 22 for execution on the processor 16. As will be described in further detail below, the program code of the packet analysis software provides the function of interpreting the contents of a captured frame based upon the contents of a protocol definition file. It could also include, for example, the protocol editor function summarized above, and optionally the graphical user interface software for allowing a user to interact with the editor. Also included with the protocol analyzer 12 is an appropriate computer display 18 device, such as a cathode ray tube or liquid crystal display, for providing the necessary display capabilities for viewing the results of the packet analysis. Also, the device 12 includes any suitable input devices, such as a keyboard and a mouse device (not shown).

It will be appreciated that FIG. 1 is for illustration purposes only, and should not be viewed as limiting the teachings of the present invention. First, protocol analyzer 12 could be implemented as a dedicated network analyzer device and as a single "self-contained" unit. Alternatively, the device could be implemented exclusively within a general purpose personal computer (PC), such as a laptop computer having an appropriately configured NI module 14. Or, the device 12 could be implemented with a "stand-alone" network analyzer portion that connects to, and is controlled by, a general purpose PC, such as a laptop computer. With this approach, the analyzer portion would provide the physical interconnection to the network, and would provide some of the processing power for the analysis software. The PC would "control" the analyzer, and would provide some the graphic display, and well as the input capability. Moreover, the PC would be used to store captured information, and would include the protocol editor and protocol database functionality. The present invention can be implemented via any one of these implementation approaches.

III. Data Frame Content

Figure 2A:
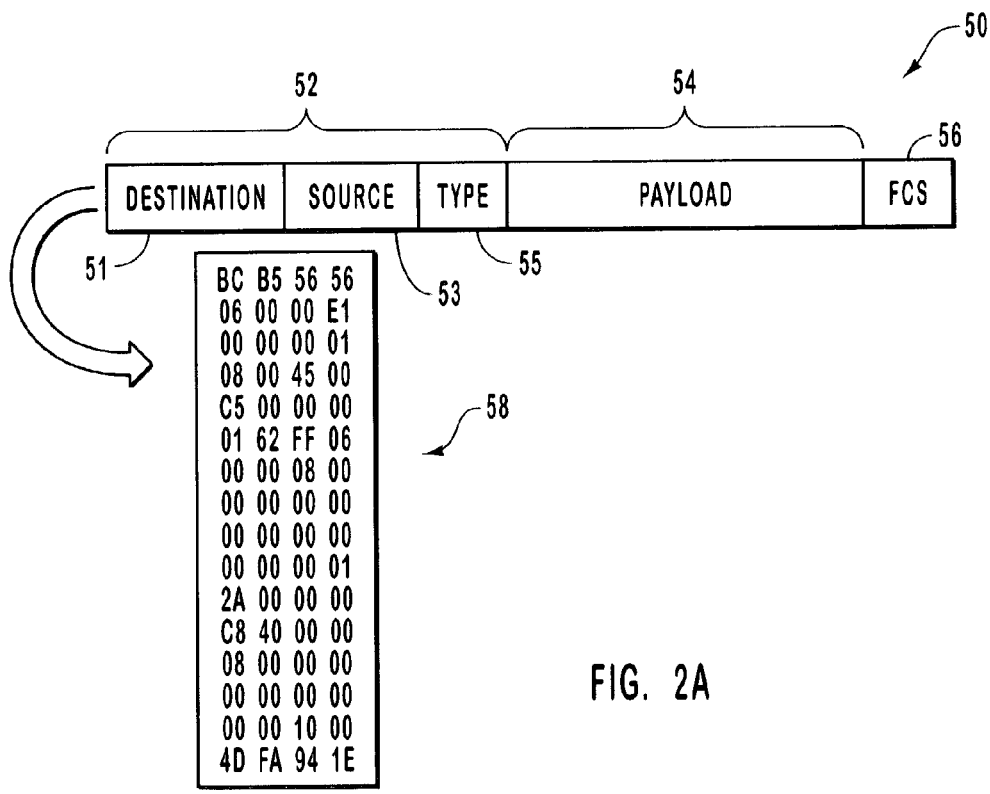
FIG. 2A illustrates a data frame and its physical layer protocol attributes.

Referring next to FIG. 2A, one example of the format of a network data frame is described. Illustrated is the layout of a single data frame, which is designated generally at 50. Again, while the teachings of the present invention can be used for the analysis of most any physical layer frame-type, for purposes of illustration, the illustrated frame 50 is structured in accordance with the format specified by the Ethernet physical layer protocol. The Ethernet data frame begins with an 8-byte preamble field (which is not shown in this illustration), which is used for synchronization purposes. This preamble is followed by a "destination address" field 51, which designates the unique address of the network connected device that is to receive the data frame. Next is the "source address" field 53, which designates the unique address of the device that sent the data frame. Each of these address fields contain the Medium Access Control ("MAC") addresses of the source and destination devices on the network 30. The MAC address is a unique address hardwired into the station's network interface card, such as that shown at 14 in FIG. 1. For the Ethernet protocol, each address is 6 bytes (48-bits) in length.

Following the source address is the Type Field 55 (sometimes referred to as the "Ethertype"), which is a 2-byte field that includes a value that specifies what higher layer protocol (if any) is present within the following data field, or "payload," that is designated at 54. The destination and source address fields and the Type field 55 are collectively referred to as the "Ethernet Frame Header" 52.

The Ethernet payload 54 is a variable sized field that ranges anywhere from 46 to 1,500 bytes. It can contain any one of a number of higher level protocol messages (i.e., that correspond to the higher levels of the 7-layer stack model), as well as the actual "data" that is being transmitted via the data packet 50. In fact, there can be a "stacking" of different protocol messages contained within the Ethernet data frame that can easily exceed five layers. The last field is a 4 byte frame sequence ("FCS") 56, which is used for error detection.

As is well known, the content of the Ethernet data frame is derived from a serial stream of digital ones and zeroes that are electronically (or optically, depending on the network medium used) represented on the network physical medium. These ones and zeroes are captured and separated into the discrete packets of the sort illustrated at 50 in FIG. 2A. Typically, the packet contents are represented in a hexadecimal format, similar to what is shown in the box 58 of FIG. 2A. It will be appreciated that this sort of data is not easily understood for a human user when debugging a network. Moreover, as noted, the Ethernet data frame can also include many layers of other protocol messages. Consequently, it is desirable for this information content to be translated into a higher level, user understandable format, so as to provide a useful set of information for analysis of the network.

IV. Data Flow and General Process Overview

A. Generation of Program Code

Figure 2B:
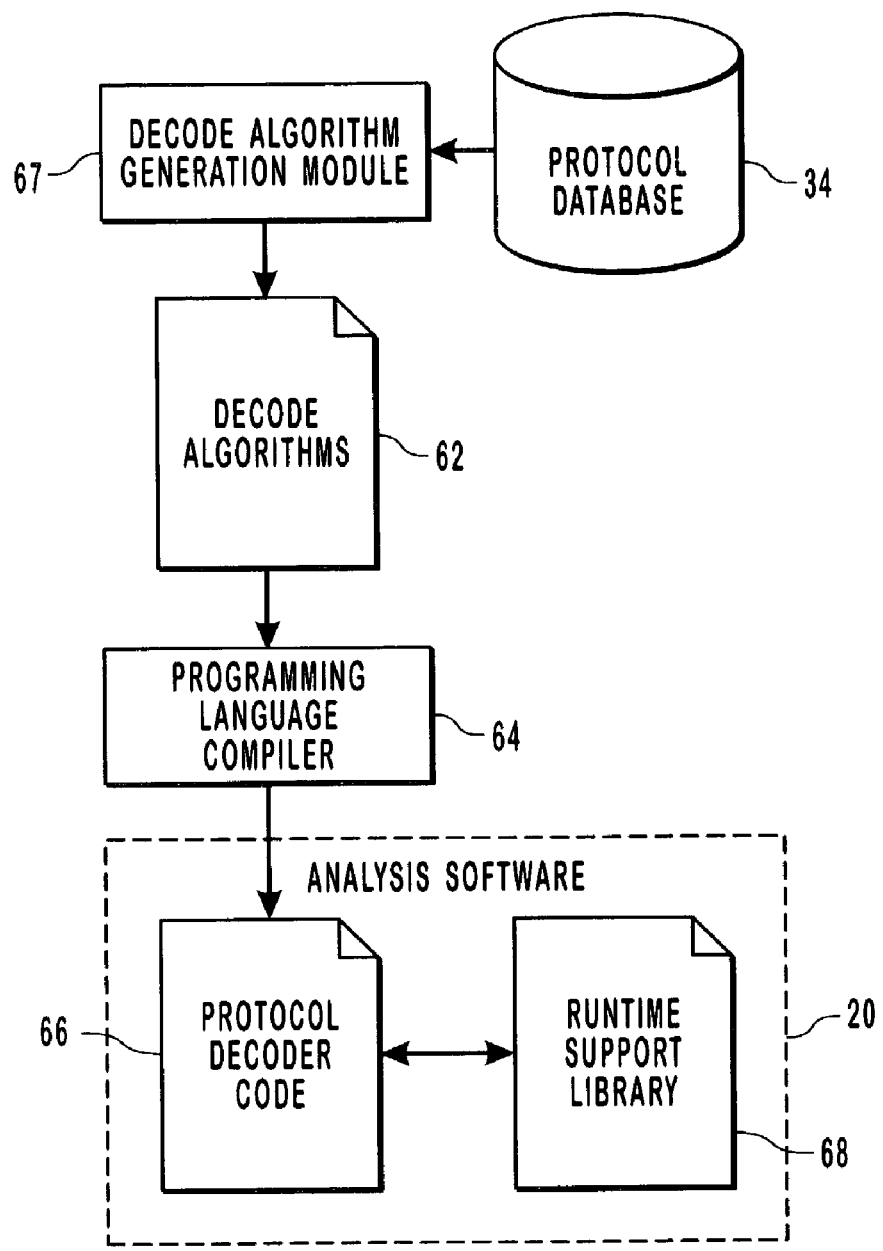
FIG. 2B illustrates the functional modules of a system for generating program code based on protocol definition constructs contained in a protocol database.

FIG. 2B illustrates the functional modules that can be used according to the invention to generate the program code that is used by the protocol analyzer to interpret and analyze data packets in a network. A protocol database 34, which represents a declarative specification of a protocol, includes the definitional information that is used to generate the program code according to the invention, which represents a procedural specification of the protocol. As used herein, the term "declarative" extends to any definition or specification of a protocol that has declarative elements and cannot be directly executed without transformation to a procedural programming language. In general, such declarative definitions or specifications include those that are wholly declarative and those that have other elements (e.g., procedural elements) in addition to the declarative elements. As used herein, the term "procedural" extends to any definition or specification of a protocol that is written in a programming language and is used to distinguish from "declarative" specifications. Accordingly, "procedural" specifications include those that are expressed in conventional procedural programming languages (e.g., C++, Java) and, for purposes of this document, also extends to those that are conventionally designated as having functional elements (e.g., Lisp). While the protocol database can be assembled or formatted in any suitable way, examples of the format of and techniques for assembling the protocol database 34 are described herein in reference to FIG. 1 and the '454 application that has been incorporated herein by reference. In general, however, the protocol definition files or other definitional information included in the protocol database should be expressed in a computer interpretable format, which enables the information in the protocol database to be converted to program code.

The system illustrated in FIG. 2A includes a decode algorithm generation module 67 that uses language compilation techniques to perform semantic analysis on the expressions contained in the protocol definition files to generate decode algorithms 62 that are expressed using a conventional programming language. In other words, module 67 of FIG. 2A is used to convert the protocol definition files of protocol database 34 to decode algorithms 62 that are written in any desired computer programming language, such as C++, Java, etc. Because the protocol database 34 includes definitional information relating to the protocol that is expressed using a computer interpretable format, the programming language decoder generation module can be a conventional computer language compilation module or system and can use compilation techniques that will be known by those of skill in the art upon learning of the invention disclosed herein.

Thus, decode algorithms 62 represent program code that can be used by a protocol analyzer for analyzing and interpreting data frames. Indeed, the content of the decode algorithms 62 can be similar to those that might be generated manually be knowledgeable software developers. However, a significant difference between the decode algorithms 62 of the invention, compared to conventional protocol analysis software, is that the decode algorithms 62 are generated mechanically and without direct manual programming, whereas conventional techniques required software developers to manually translate a declarative protocol specification to the procedural language of program code. Thus, the techniques for generating the decode algorithms according to the invention eliminate the need for manual programming efforts and the associated testing and debugging that would otherwise be required. As used herein, the terms "without manual intervention" and "without manual development" regarding the techniques for generating the program code indicate that the program code can be generated without requiring a software developer to manually translate a declarative specification of the protocol specification to the procedural language of the program code.

Moreover, once the protocol database has been assembled, the costs of generating the decode algorithms approach zero. For this reason, decode algorithms 62 can be easily generated using any or multiple programming languages, as the need arises, without requiring effort by software developers. For instance, if one protocol analyzer requires C++ code, while another requires Java code, both types of program code can be easily generated using the techniques of the invention. Thus, the protocol definition files can be retranslated to program code expressed in the different programming language as desired. Also, when an existing protocol changes or a new protocol is introduced, the effort associated with updating the system of FIG. 2B is focused on adapting the protocol definition files of protocol database 34 rather than manually developing new program code. Once the protocol database has been modified to reflect modifications of the underlying data protocol, the modified protocol definition files can be retranslated to generate modified program code that can be used to analyze data having the modified data protocol. Thus, the techniques of the invention can be used to quickly and inexpensively update the program code once the relevant changes have been made to the protocol database 34.

Once the decode algorithms 62 are compiled, a programming language compiler 64 is used to compile binary code (protocol decoder code 66 and optional runtime support library 68) to be executed by the protocol analyzer. The term "program code" as used herein, refers to computer-executable instructions that can be used to interpret and/or analyze data having one or more defined protocols. The term "program code" extends to such computer-executable instructions that are expressed in a programming language (e.g., decode algorithms 62) or in a binary format (e.g., protocol decoder code 66) Again, the techniques for compiling the binary code based on the decode algorithms 62 can be conventional, and will be understood by those of skill in the art upon learning of the invention disclosed herein. As shown in FIG. 2B, protocol decoder 66 and runtime support library 68 correspond generally to analysis software 20 of FIG. 1.

Protocol decoder code 66 and the optional runtime support library 68 can then be used to analyze and interpret data. Because the invention provides program code to a protocol analyzer for this purpose, the operation of the protocol analyzer, once the program code has been generated, can be similar to the operation of conventional protocol analyzers that use program code that is manually encoded by software developers.

Figure 2C:
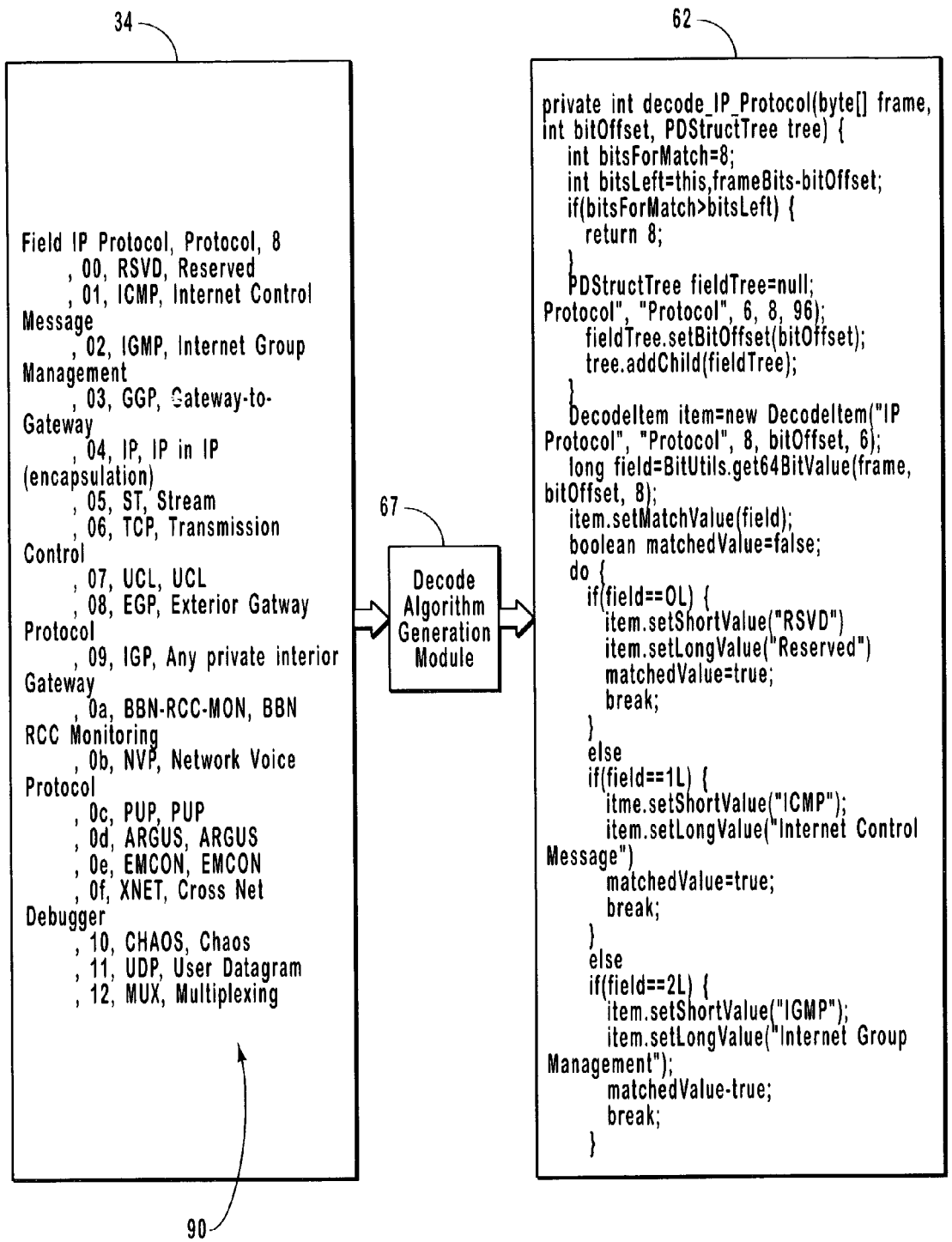
FIG. 2C is a functional block diagram illustrating an example of the data flow in one embodiment of the methods for generating program code based on protocol definition constructs contained in a protocol database.

FIG. 2C illustrates in detail one specific example of the mechanical generation of program code, which represents a procedural specification of a protocol, from a protocol database 34, which represents a declarative specification of the protocol. Protocol database 34 includes definitional expressions 90 that relate to the protocol. It is noted that FIG. 2C illustrates only a small portion of the definitional expressions 90 that are likely to be included in a the protocol definition files of a typical protocol database 34.

The decode algorithm generation module 67 then performs semantic analysis on the definitional expressions 90 to generate decode algorithms 62 that are expressed using a conventional programming language which, in this example is Java. One of the advantages of the invention is that the decode algorithms 62 can be generated in substantially any desired programming language.

The programming language compiler (i.e., compiler 64 of FIG. 2A) then compiles binary protocol decoder code 92 to be executed by the protocol analyzer. Both decode algorithms 62 and binary protocol decoder code 92 represent different expressions of a procedural specification of the protocol that has been generated from the declarative specification of the protocol embodied in the definitional expressions 90 of the protocol database 34. The specific example of FIG. 2C has been presented to illustrate the techniques by which the program code can be mechanically generated, and definitional expressions relating to substantially any protocol can be converted to program code in substantially any programming language according to the invention.

B. Interpretation and Analysis of Network Data

Figure 3:
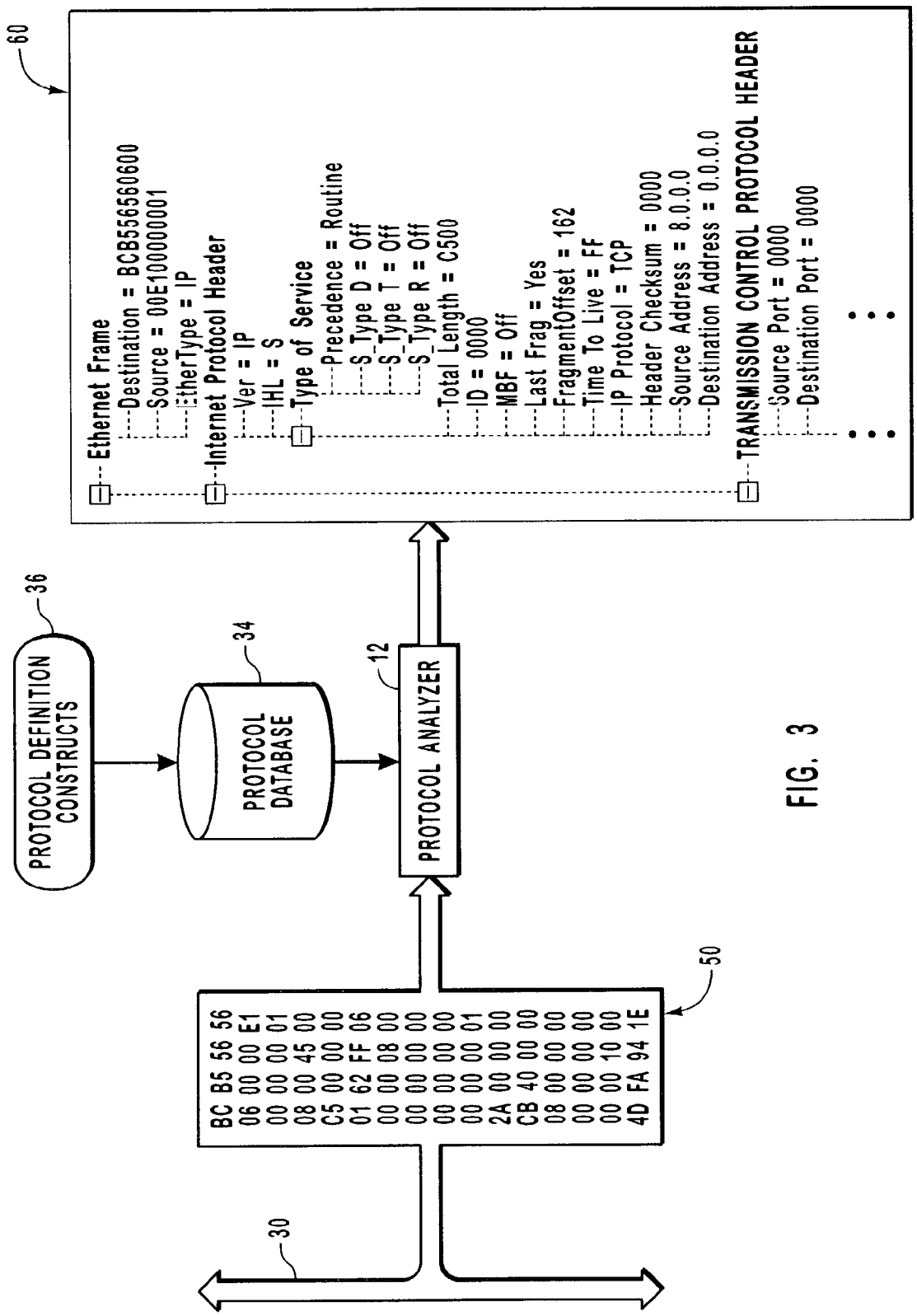
FIG. 3 is a functional block diagram illustrating the data flow in one embodiment of the methods for analyzing network data using the protocol analyzer.

Reference is next made to FIG. 3, which provides an overview of the general flow of information, along with the corresponding general processing steps used in one embodiment of the invention. FIG. 3 is a functional diagram, illustrating the general flow of information through a protocol analyzer using program code that has been generated according to the invention.

In general, the invention is useful for generating program code that can be used for substantially any transformation or analysis of network data, one example of which is described below in reference to FIG. 3. Although FIG. 3 illustrates one example of a method for implementing the program code generation methods of the invention, these methods are not limited to this implementation. In general, the program code can be generated as needed to analyze frame contents. For instance, the program code can be generated in response to an action taken by a user. Moreover, the methods of the invention can be practiced in combination with any suitable hardware or network configuration and are not limited to those described in the example of FIG. 3. The invention is also not limited to the particular examples of protocol definitions, but instead can be used in combination with any suitable method for defining a protocol.

As shown in FIG. 3, protocol definition constructs 36 are used to construct a protocol database 34, which represents one example of the protocol definitions that can be used to generate program code according to the invention. Protocol analyzer 12 obtains code that has been generated using a decode algorithm generation module (e.g., module 67 of FIG. 2B).

The protocol analyzer 12 then causes an appropriate viewer to be displayed on a computer display (e.g., 18 in FIG. 1). The viewer provides a defined viewing area for displaying frame contents and descriptions to the user. Again, while this viewing area can take any one of a number of forms, in a preferred embodiment it is provided as a graphical interface on the computer display 18. The protocol analyzer 12 then obtains a data frame from the network 30. As is well know, this functionality is provided by way of the network interface module 14, which obtains serial data from the physical medium of the network 30, and segments the data into data frames in accordance with the particular physical layer protocol of the interface module 14. The frame is typically provided to the logic of the protocol analyzer 12 via a memory buffer (such as at 22 in FIG. 1). FIG. 3 depicts one example of a Ethernet physical layer data frame, designated at 50, along with an illustration of its numeric contents in hexadecimal format.

The analyzer interprets the frame using the program code that has been generated in accordance with the contents of the protocol definition file previously defined and stored in the protocol database 34. In addition, the frame's contents are displayed in the manner prescribed by the protocol definition file, including, preferably, with some type of description using a higher-level, user understandable format. An example of the type of information that can be displayed is indicated in the display area 60 of FIG. 3. For example, a suitable display may include descriptive language for the "Destination" address, the "Source" Address, the type of protocol (IP) specified in the "EtherType" field, and so on. Also, in pre- ferred embodiments, the system allows the user to graphically select the type and extent of information that is displayed for a selected frame. The manner in which the frame is interpreted, and its contents displayed, will depend on the type of constructs used, and the particular protocol involved.

The program code that is generated based on the protocol definitions is generally structured to provide the analysis or transformation of the frame contents that is desired or required for any given application. Although the invention is not limited to any particular program code or type of analysis or transformation that is to be performed by executing the program code, Appendix A sets forth one example of a protocol definition and Appendix B shows corresponding decode algorithms for Ethernet physical layer frames.

Appendix A represents the protocol definition, and has a section defining the structure of a frame. The section defining the structure of the frame can include, for example, the overall structure, substructures, and alternative structures. The structures defined by the protocol definition can include fields that are characterized by a field type, a field length, and acceptable values of the fields.

Appendix B represents decode algorithms that can be generated, in this specific example, based on the protocol definitions set forth in Appendix A. In general, the decode algorithms include a function for each of the fields defined in the protocol definition. In this example, the arguments to these functions include the frame, the current bit offset within the frame, and a pointer to a location in a decode tree that is to be generated. The decode tree is a data structure that is used to organize the results of the analysis of the frame's contents. One example of a decode tree that is generated upon processing and analyzing a frame is illustrated at element 60 in FIG. 3. Each function generally has a series of alternative statements that correspond to the different possible interpretations or values of the field. The function updates the decode tree using the decoded information from the field. The function also outputs the number of bytes that are consumed during the process of executing the function to update the bit offset appropriately. In this manner, the frame's contents can be analyzed using code that is mechanically generated from a protocol definition without requiring manual software development.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for interpreting the contents of captured network data contained in a data frame on a communications network, the method comprising:

accessing a protocol database containing protocol definitions for a plurality of protocol types, the plurality of protocol types including at least one physical layer protocol and at least one higher level protocol;

selecting a protocol definition that corresponds to a protocol type used by a data frame on a communications network;
automatically and without manual intervention generating source code for a decode algorithm based on the selected protocol definition, wherein the source code for the decode algorithm is generated in a predetermined, processor independent, procedural language;
compiling the source code for the decode algorithm into corresponding machine executable binary instructions that are executable on a predetermined programmable device; and
executing the machine executable instructions on the predetermined programmable device so as to provide a user-understandable description of the data having the protocol type of the selected protocol definition and contained in a captured data frame.

2. The method of claim 1, further comprising automatically and without manual intervention generating the decode algorithm in a second processor independent, procedural language.

* * * * *